United States Patent [19]

Lyga et al.

[11] Patent Number: 4,881,457
[45] Date of Patent: Nov. 21, 1989

[54] LOW-HEADROOM POPCORN POPPER

[75] Inventors: Thomas M. Lyga, Terryville; William D. Ryckman, Jr., Orange, both of Conn.

[73] Assignee: Black & Decker, Inc., Newark, Del.

[21] Appl. No.: 115,846

[22] Filed: Nov. 2, 1987

[51] Int. Cl.⁴ .............................................. A23L 1/18
[52] U.S. Cl. .................................. 99/323.5; 99/323.9
[58] Field of Search ................. 99/323.4, 323.5, 323.6, 99/323.7, 323.8, 323.9, 323.11; 426/445, 450

[56] References Cited

U.S. PATENT DOCUMENTS

| | | | |
|---|---|---|---|
| 2,922,355 | 1/1960 | Green | 99/323.11 |
| 3,323,440 | 6/1967 | Grant | 99/323.5 |
| 4,178,843 | 12/1979 | Crabtree | 99/323.8 |
| 4,494,314 | 1/1985 | Gell | 99/323.7 |

*Primary Examiner*—Robert W. Jenkins
*Attorney, Agent, or Firm*—Armstrong, Nikaido, Marmelstein, Kubovcik & Murray

[57] ABSTRACT

A low-headroom popcorn popper, particularly for under-cabinet mounting, employs a charging drawer alongside an intermediate chute for entering kernels of corn into a popping chamber. The corn remains in the charging drawer until a charging slide is pushed to permit the corn to enter the popping chamber. A horizontal air path between a blower and a plenum surrounding the popping chamber further reduces headroom. Air enters the perimeter of the popping chamber from the plenum in a horizontal swirling motion produced by slanted louvers. A door closes an open bottom of the popping chamber to permit removal of unpopped kernels of corn and other debris therefrom. Heater elements are disposed in the plenum chamber non-uniformly in angle about the popping chamber to attain a substantially uniform air temperature entering the popping chamber. Separation of popped corn from unpopped kernels of corn is attained using two cylindrical sections connected by a diverging conical section. Popped corn rises upward on the air stream until it passes over a dam, whereupon it falls down a discharge chute. An electrical control system controls a WAIT light and a READY light to indicate to a user the time that an optimum popping temperature exists in the popping chamber. An overtemperature sensor deenergizes the heater, blower and the ready light, and energizes the WAIT light when an unsafe temperature is approached.

18 Claims, 9 Drawing Sheets

LOW-HEADROOM POPCORN POPPER

BACKGROUND OF THE INVENTION

The present invention relates to kitchen appliances and, more particularly, to popcorn poppers.

One type of popcorn popper, with which the present invention is particularly concerned, employs a flow of heated air through unpopped kernels of corn to raise their temperature to a value high enough to generate steam within the kernels, thereby forcing explosive expansion of the hard kernels into the familiar soft popped corn. An air popper preferably includes means for separating the popped corn from the unpopped kernels. One way for performing such separation includes permitting the heated air to escape in an upward direction. The larger cross section of the popped corn permits it to be carried upward and to exit the corn popper while the smaller cross section of the unpopped kernels tends to permit them to remain in the bottom of the popper for additional heating until substantially all of the corn is popped and delivered from the popper by the exiting flow of air.

Balancing the requirements for attaining satisfactory popping while separating the popped corn from the unpopped kernels presents a critical problem in an air popper. The air flow through a popping chamber must be high enough to keep the unpopped kernels stirred for even heating. Excessive air flow velocity, however, tends to drive an unacceptable proportion of unpopped kernels out of the popping chamber along with the popped corn.

Conventional air poppers position a fan below the popping chamber and provide for feeding kernels through a top opening and for permitting exit of the popped corn through the same top opening. The assignee of the present invention has developed a popular line of kitchen appliances to be mounted on the underside of suspended cabinets. The line is characterized by small vertical dimensions in order to provide minimum interference with counter space frequently disposed below the cabinets. The present invention is a member of this low-headroom family.

Undercabinet mounting denies access to the top of the popper for adding kernels or for receiving the popped corn. In addition, the vertical alignment of blower, popping chamber and fill/delivery chamber increases the vertical dimension of prior art devices beyond acceptable limits for a device mounted under suspended cabinets and over a counter.

All air poppers tend to leave debris in the popping chamber. Debris from the popping chamber of a conventional air popper can be dumped out by inverting the air popper and can be cleaned through its top opening. Undercabinet mounting prevents both of these actions.

OBJECTS AND SUMMARY OF THE INVENTION

Accordingly, it is an object of the invention to provide an air popper which overcomes the drawbacks of the prior art.

It is a further object of the invention to provide an air popper having low headroom.

It is a still further object of the invention to provide an air popper having a blower and popping chamber disposed at about equal vertical positions.

It is a still further object of the invention to provide an air popper including means for separating unpopped kernels from popped corn.

It is a still further object of the invention to provide a bottom cleanout for a popping chamber of an air popper.

It is a still further object of the invention to provide a corn-fill apparatus for an air popper which adds no height to the overall headroom of the apparatus.

It is a still further object of the invention to provide an air popper having a horizontal air path from its blower to its popping chamber.

It is a still further object of the invention to provide an air popper wherein air is delivered to a plenum surrounding the popping chamber and is then admitted to the popping chamber through louvers slanted to produced vortex motion of the air in the popping chamber.

It is a still further object of the invention to provide an air popper having a diverging conical section above the popping chamber for separating unpopped kernels from popped corn.

It is a still further object of the invention to provide an air popper having a first thermostat controlling an indicator signifying the end of a warmup period.

It is a still further object of the invention to provide an air popper having a second thermostat effective for disabling a heater and fan upon attainment of an excessive temperature. The second thermostat also controls an indicator signifying a waiting period before operation should be resumed.

Briefly stated, the present invention provides a low-headroom popcorn popper, particularly for under-cabinet mounting, employing a charging drawer alongside an intermediate chute for entering kernels of corn into a popping chamber. The corn remains in the charging drawer until a charging slide is pushed to permit the corn to enter the popping chamber after a suitable temperature is attained therein. A horizontal air path between a blower and a plenum surrounding the popping chamber further reduces headroom. Air enters the perimeter of the popping chamber from the plenum in a horizontal swirling motion produced by slanted louvers. A door closes an open bottom of the popping chamber to permit removal of unpopped kernels and other debris therefrom. Heater elements are disposed in the plenum chamber non-uniformly in angle about the popping chamber to attain a substantially uniform air temperature entering the popping chamber. Separation of popped corn from unpopped kernels is attained using two cylindrical sections connected by a diverging conical section. Popped corn rises upward on the air stream until it passes over a dam, whereupon it falls down a discharge chute. An electrical control system controls a WAIT light and a READY light to indicate to a user the time that an optimum popping temperature exists in the popping chamber. An overtemperature sensor deenergizes the heater, blower and the ready light, and energizes the WAIT light when an unsafe temperature is approached.

According to an embodiment of the invention, there is provided an air popper for popping popcorn comprising: a blower, a plenum, means for conducting air from the blower to the plenum, a popping chamber in the plenum, means for admitting air from the plenum into the popping chamber, means for heating air in at least one of the means for conducting air and the plenum, and the blower, the plenum and the means for conducting air being horizontally disposed with respect to each other, whereby vertical height of the air popper is minimized.

According to a feature of the invention, there is provided an air popper for popping popcorn comprising: a popping chamber, an intermediate chute above the popping chamber, means for introducing a flow of heated air into the popping chamber whereby kernels of corn are heated to a popping temperature, the flow of heated air being effective for selectively displacing popped corn upward in the intermediate chute, means for permitting the popped corn to enter a discharge chute, and the discharge chute being disposed generally parallel to the intermediate chute, whereby headroom is conserved.

According to a further feature of the invention, there is provided an air popper for popping popcorn, comprising: a popping chamber, an intermediate chute above the popping chamber, means for introducing a flow of heated air into the popping chamber, the intermediate chute being effective for permitting the heated air to escape upward, thereby carrying popped corn with it, means in the intermediate chute for separating popped corn from unpopped kernels of corn, a discharge chute substantially parallel to the intermediate chute, means for permitting the heated air and the popped corn to move horizontally between a top of the intermediate chute to a top of the discharge chute, the discharge chute being effective for permitting the heated air and the popped corn to flow downward to exit the air popper, and means for charging kernels of corn laterally into the popping chamber without requiring access to a top of the popcorn popper.

According to a still further feature of the invention, there is provided an electrical system for an air popper comprising: a blower motor, a heater, means for energizing the blower motor and the heater, a wait light, a ready light, a first thermostatic switch for maintaining the wait light illuminated and the ready light extinguished until a first predetermined minimum temperature is attained in the air popper, and for maintaining the wait light extinguished and the ready light illuminated when the predetermined minimum temperature is exceeded, and a second thermostatic means responsive to a second temperature substantially higher than the first predetermined temperature for extinguishing the ready light, the blower motor and the heater, and for illuminating the wait light, whereby an overtemperature control is exercised.

According to a still further feature of the invention, there is provided a method for popping corn in an air popper comprising: loading a quantity of kernels into a charging space, turning on a blower and a heater, illuminating a wait light until a predetermined temperature exists in the air popper, illuminating a ready light when at least the predetermined temperature exists in the air popper, and charging the quantity of kernels into a popping chamber when the ready light is illuminated.

The above, and other objects, features and advantages of the present invention will become apparent from the following description read in conjunction with the accompanying drawings, in which like reference numerals designate the same elements.

DETAILED DESCRIPTION OF THE PREFERRED EMBODIMENT

Figure 1:
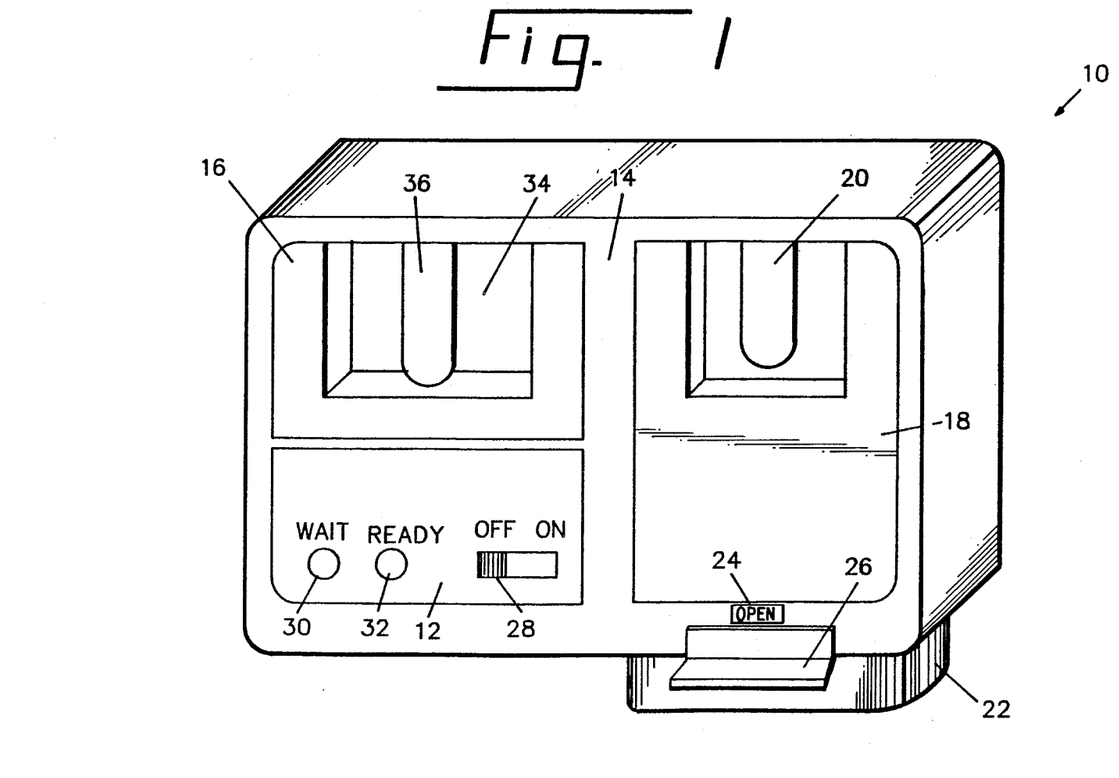
FIG. 1 is a perspective view of an air popper according to an embodiment of the invention.

Referring to FIG. 1, there is shown, generally at 10, an air popper designed for undercabinet mounting. Air popper 10 includes a control panel 12 in a lower portion at one side of a front surface 14 thereof. A charging drawer 16 is disposed in front surface 14 above control panel 12. A delivery chute front cover 18 fills substantially all of the other side of front surface 14. A butter cup 20 is removably disposed in delivery chute front cover 18. An output guide 22 is disposed in a bottom of air popper 10 below delivery chute front cover 18. A latch button 24, when pressed, releases a front of output guide 22 for hinging downward about a pivot (not shown) for uncovering a bottom of a popping chamber (not shown in FIG. 1) to enable cleaning thereof without requiring access to it from above. A handle 26 facilitates latching and unlatching output guide 22.

Control panel 12 includes an ON-OFF switch 28 for controlling application of electric power to all apparatus within air popper 10. A WAIT indicator lamp 30 is illuminated at any time that measured temperatures in air popper 10 are outside a predetermined range to inform a user of this condition. A READY indicator lamp 32 is illuminated when the measured temperatures are within the popping range.

Charging drawer 16 includes a charging slide 34 having a charging-slide handle 36 accessible on a front surface thereof. As will be more fully developed later herein, charging drawer 16 provides means for loading corn kernels therein and, in a later operation, the corn kernels are charged into a popping chamber (not shown) by pressing charging slide 34 inward.

In use, it has been determined that air entering the popping chamber should exceed a predetermined minimum temperature before corn kernels are charged therein for popping. Initially, corn is placed in charging slide 34, but is not charged into the popping chamber. Then ON-OFF switch 28 is placed in the ON position. This illuminates WAIT indicator lamp 30 to indicate that the temperature of air entering the popping chamber is too low for satisfactory popping. When the optimum air temperature is detected, charging slide 34 is pressed inward to charge the waiting corn kernels into the popping chamber. The corn is popped and falls down behind delivery chute front cover 18 and through output guide 22 into a waiting receptacle (not shown).

Figure 2:
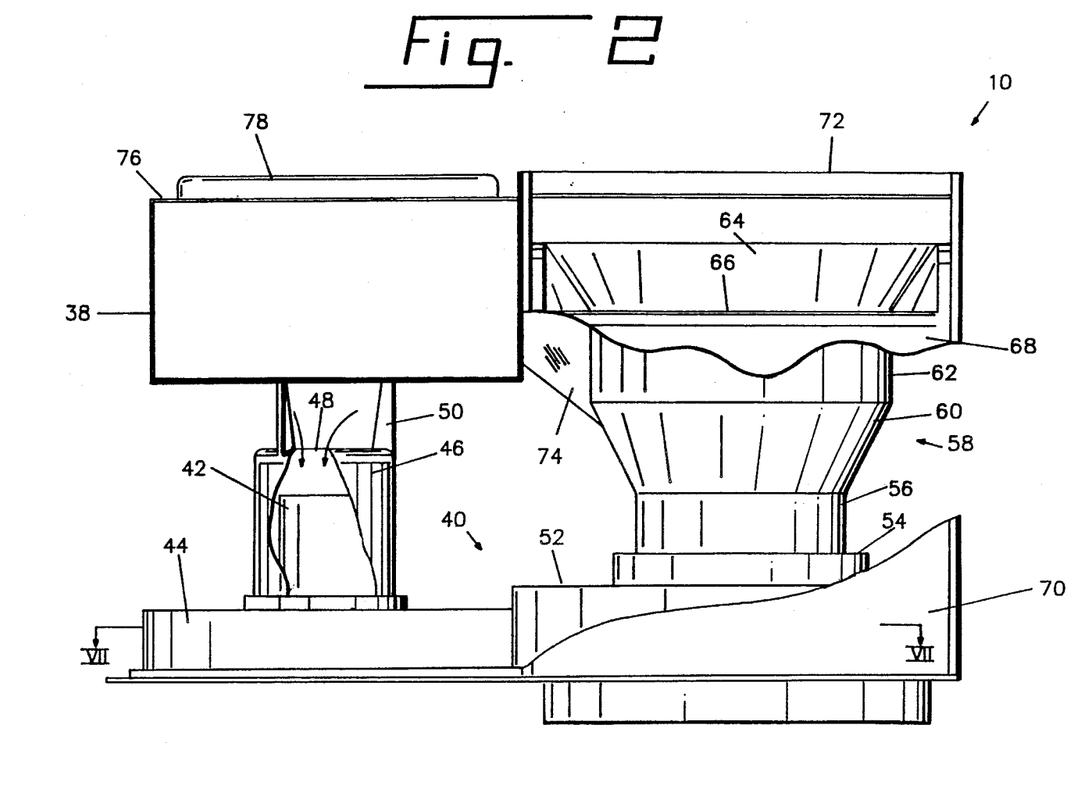
FIG. 2 is a front view of the air popper of FIG. 1 with covers and other elements removed to reveal internal components, partially cut away.

Referring now to FIG. 2, a front view of air popper 10 is shown from which the outer elements have been removed to reveal internal components. A drawer slide 38 for receiving charging drawer 16 (removed in FIG. 2) is disposed above an integrated blower and plenum chamber 40. A blower motor 42 is centered in a blower housing 44 of integrated blower and plenum chamber 40. An insulating shield 46 covers blower motor 42 to prevent accidental contact with electrical connection on blower motor 42. An air intake 48 in insulating shield 46, centered above blower motor 42, forces incoming air to flow along the length of blower motor 42, thereby cooling blower motor 42. The air path is indicated by arrows in the figure. A plurality of vertical supports 50 (only one of which is shown in the cutaway view) are integrally formed with insulating shield 46, extending upward to prevent objects from entering air intake 48 and to provide support for drawer slide 38.

A plenum chamber 52 of integrated blower and plenum chamber 40 includes a connecting collar 54 for substantially air-tight connection to a lower cylindrical portion 56 of an intermediate chute 58. As will be described later, a popping chamber (not shown) is contained in plenum chamber 52 centered below intermediate chute 58. An outwardly tapered conical portion 60 joins an upper end of lower cylindrical portion 56 to a lower end of an upper cylindrical portion 62. A top flare 64 terminates an upper end of intermediate chute 58 about the two sides and rear thereof. A front dam 66 provides a barrier over which popped kernels must pass to reach a discharge chute 68 defined at its front by delivery chute front cover 18 (FIG. 1) and at its rear by a discharge chute rear wall 70 passing from front dam 66 to just above output guide 22. A top cover 72 provides an upper limit for travel of popped corn and the upward-flowing air transporting it, thus encouraging such popped corn to move forward over front dam 66 and fall downward through discharge chute 68 and output guide 22.

A charging chute 74 extends diagonally downward from drawer slide 38 to upper cylindrical portion 62. As will be explained, at the appropriate time, the corn kernels are delivered through charging chute 74 to the popping chamber (not shown) below intermediate chute 58. Such side delivery of corn, without requiring access to the top of air popper 10, is one important element in making it practical to employ undercabinet mounting. A drawer top cover 76 atop drawer slide 38 includes an expansion space 77 for reasons to be detailed later in the present specification.

We have discovered that the dimensions and angles of intermediate chute 58 are critical to separation of popped corn from unpopped kernels. In particular, the axial lengths and diameters of lower cylindrical portion 56, outwardly tapered conical portion 60 and upper cylindrical portion 62, together with the divergence angle of outwardly tapered conical portion 60 must all be selected, together with an air mass flow rate through the system for correct operation. Three principal types of improper operation have been observed. Two of them consist of jamming. A soft jam is defined as a condition in which the popped corn is not carried upward and delivered through discharge chute 68 and output guide 22. Instead, the popped corn remains in intermediate chute 58 or in the popping chamber (not shown), whereby air flow is successively choked off and effective operation ceases. A hard jam is defined as a condition in which the popped corn is carried upward to contact top cover 72 in a manner allowing it to be supported there and pile up until the space over front dam 66 becomes blocked. The final type of improper operation includes delivering an unacceptable proportion of unpopped kernels with the popped corn. The parameters of intermediate chute 58, together with the airflow rate, must all cooperate to avoid both types of jams and excessive ejection of unpopped kernels.

We have discovered that, in the limited height available in an undercabinet device, there does not appear to be a combination of an air flow rate with a single diameter throughout intermediate chute 58 capable of avoiding both types of jams and of correctly separating popped from unpopped corn. In addition, we were unable to find a combination wherein the three-part nature of intermediate chute 58 is replaceable with a single conical part through its length. For example, it was discovered that a full-length cone having a divergence angle of 8 degrees permitted soft jams at low airflow rates and responded to higher airflow rates by producing hard jams and/or ejecting an unacceptable proportion of unpopped kernels. A three-part device, as illustrated in FIG. 2, with a divergence angle of 45 degrees in outwardly tapered conical portion 60 performed suitable separation but permitted soft jams to occur. When the divergence angle was reduced to 16 degrees, hard jams and unsatisfactory separation began to reappear. We finally discovered that a divergence angle of between 16 and 45 degrees was preferred with the most preferred divergence angle being from about 22 to about 30 degrees, with the best single value being about 26 degrees. In one preferred embodiment, the diameter and length of lower cylindrical portion 56 are 70 and 25 millimeters, respectively, the diameter and length of upper cylindrical portion 62 are 90 and 30 millimeters, respectively (this length is measured to the top of front dam 66), and the divergence angle of outwardly tapered conical portion 60 is 26 degrees. Although described as a threepart device, intermediate chute is preferably formed as a single unit, and most preferably of molded plastic.

Figure 3:
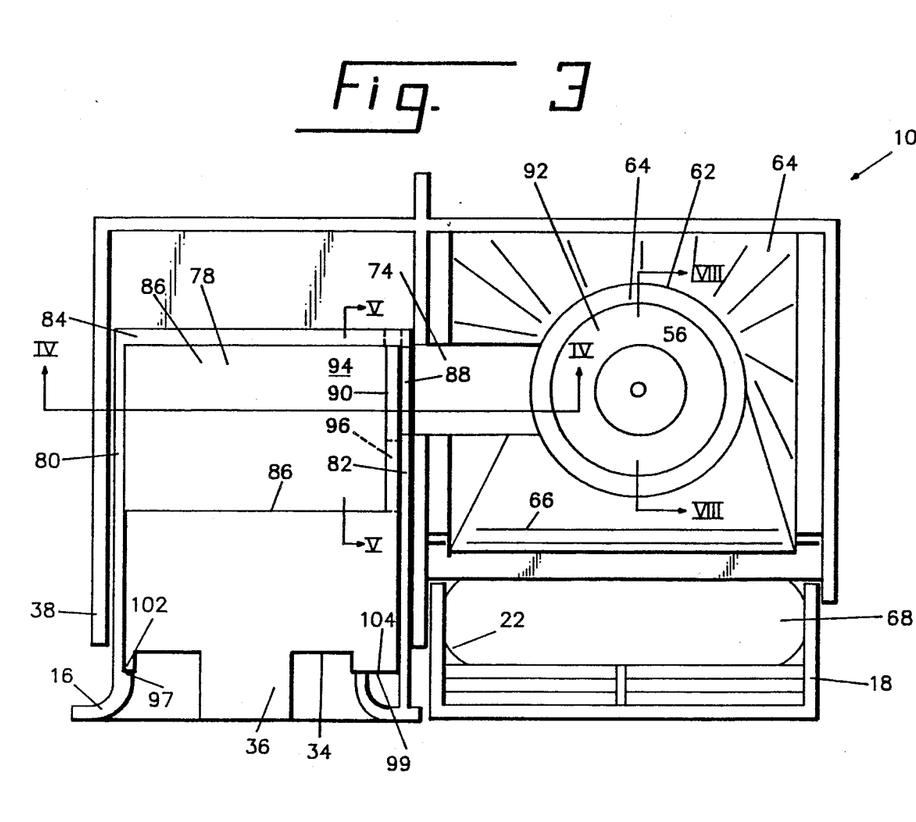
FIG. 3 is a top view of the popcorn popper of FIG. 2 with top covers removed to reveal internal components.

Referring now to the top view in FIG. 3 from which top cover 72 and drawer top cover 76 of FIG. 2 are removed, and charging drawer 16 is installed in drawer slide 38, a charging space 78 is defined by first and second side walls 80 and 82, a rear wall 84 and a rear wall 85 of charging slide 34. A sloping floor 86 of charging space 78 slopes downward from left to right in the figure to form a wedge-shaped volume. A window 88 in side wall 82 (indicated by dashed lines) is aligned with charging chute 74. The slopes of sloping floor 86 and charging chute 74 are steep enough to permit corn to slide therealong and fall into a popping chamber 92. A shutter plate 90, extending from charging slide 34 alongside side wall 82 passes into a slot 94 in rear wall 84. Charging slide 34 is normally biased forward in drawer slide 38 by resilient means (not shown in FIG. 3), whereby a window 96 in shutter plate 90 is normally positioned out of alignment with window 88, and kernels of corn (not shown) placed in charging space 78 are retained therein. Abutment surfaces 97 and 99 on side walls 80 and 82, respectively, abut abutment surfaces 102 and 104, respectively, on charging slide 34 to limit forward motion of charging slide 34.

In use, charging drawer 16 is removed from drawer slide 38 and corn kernels are added to fill charging space 78 to the top. Charging drawer 16 is then replaced in drawer slide 38 to await the end of a preheating cycle.

Figure 4:
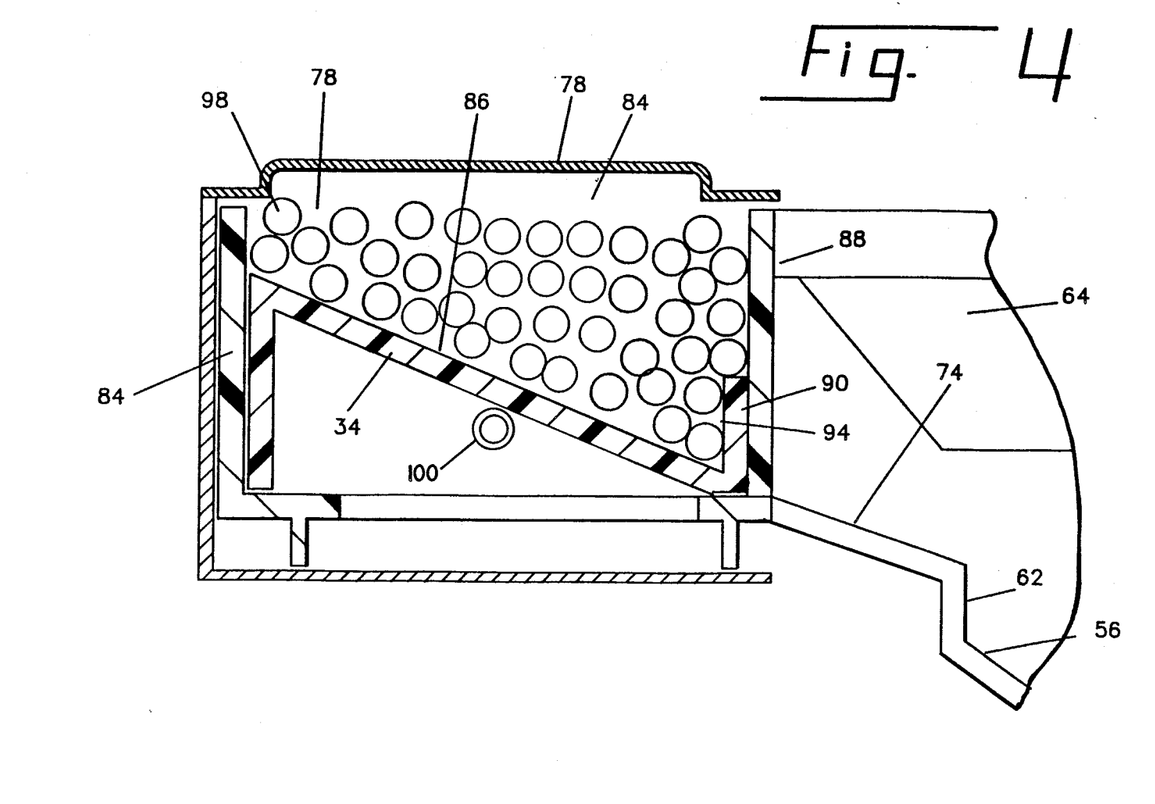
FIG. 4 is a cross section taken along IV—IV in FIG. 3.

Referring now to FIG. 4, charging space 78 is shown charged with corn kernels 98. It will be noted that sloping floor 86 and charging chute 74 are substantially contiguous and sloped steeply to permit corn kernels 98 to fall into lower cylindrical portion 56 upon actuation of charging slide 34. A coil spring 100 provides resilient urging to maintain charging slide 34 in the position shown in FIG. 3. We have discovered that, upon initial actuation of charging slide 34, some of corn kernels 98 tend to be urged upward before a substantial portion begins to fall through 88. As a consequence, we discovered that, if expansion space 77 is omitted, corn kernels 98 tend to block further forward motion of charging slide 34, thereby interfering with charging. The provision of expansion space 77 permits corn kernels 98 to bulge upward as necessary to prevent packing during the initial motion of charging slide 34 and thus to enable free charging.

Figure 5:
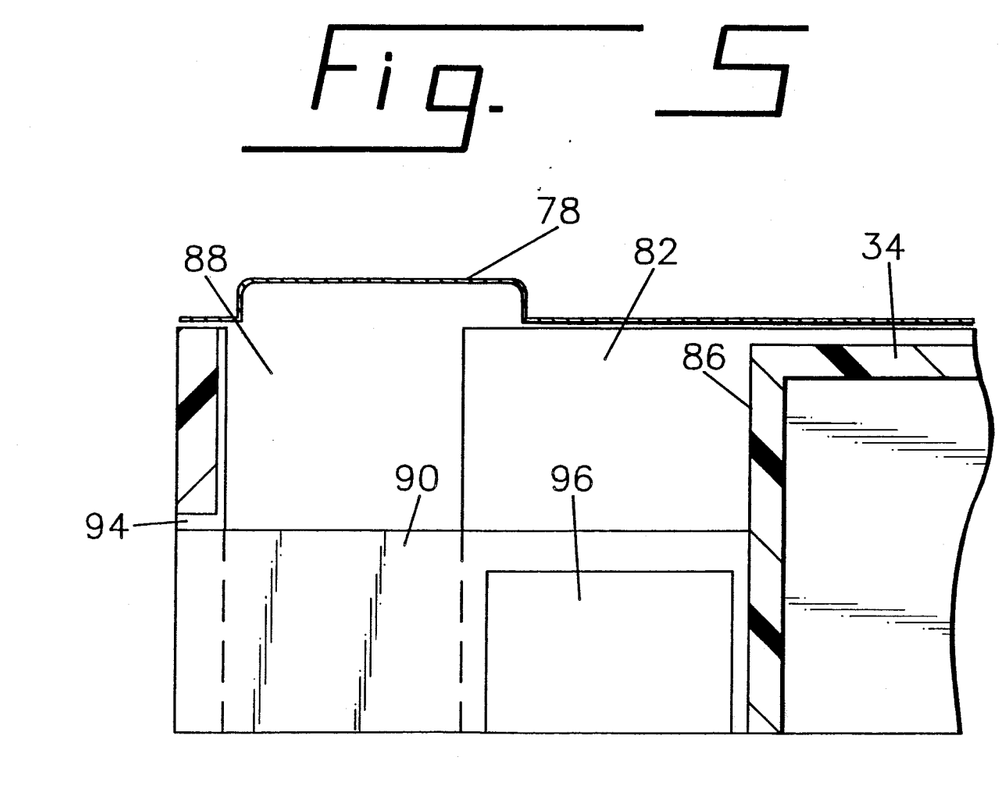
FIG. 5 is a cross section taken along V—V in FIG. 3.

Referring now to FIG. 5, a further view is shown of elements of charging slide 34 and shutter plate 90 in their quiescent positions.

Figure 6:
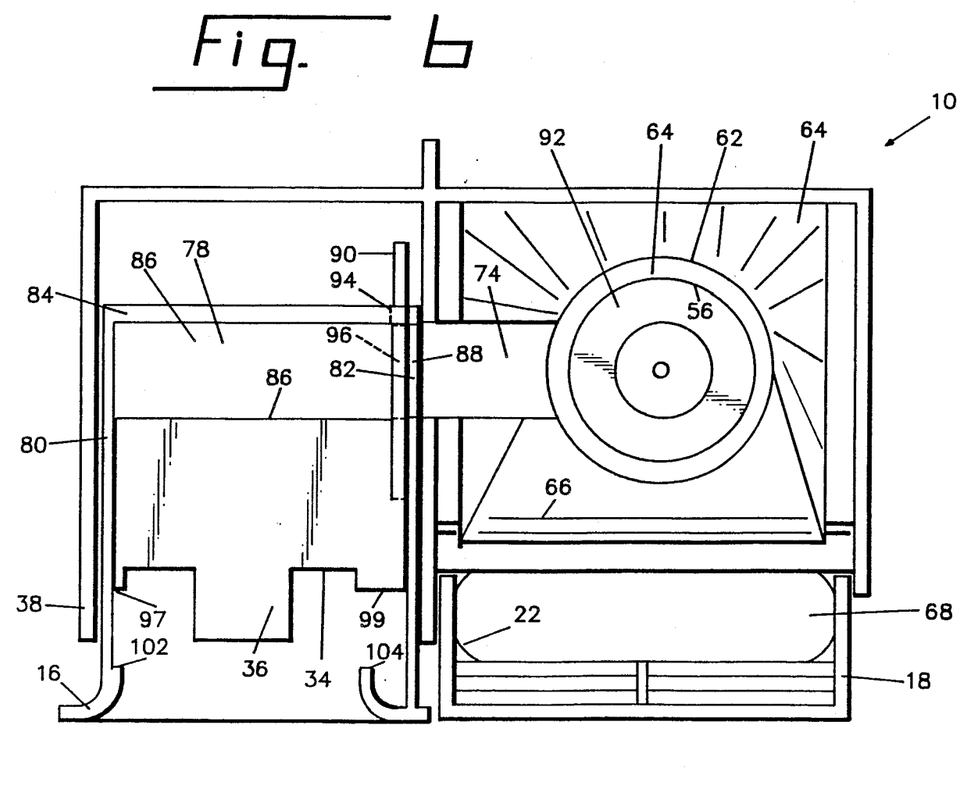
FIG. 6 is a top view corresponding to FIG. 3 with the charging slide advanced to the charging position.

Referring now to FIG. 6, air popper 10 is shown with charging slide 34 displaced inward into its charging position wherein window 96 is aligned with window 88, thereby permitting corn kernels 98 (FIG. 4) to slide down sloping floor 86 and charging chute 74 into popping chamber 92. As charging slide 34 is urged forward into its charging position shown, an end of shutter plate 90 passes through slot 94. Charging, as illustrated, is preferably performed at the end of a preheat period.

Figure 7:
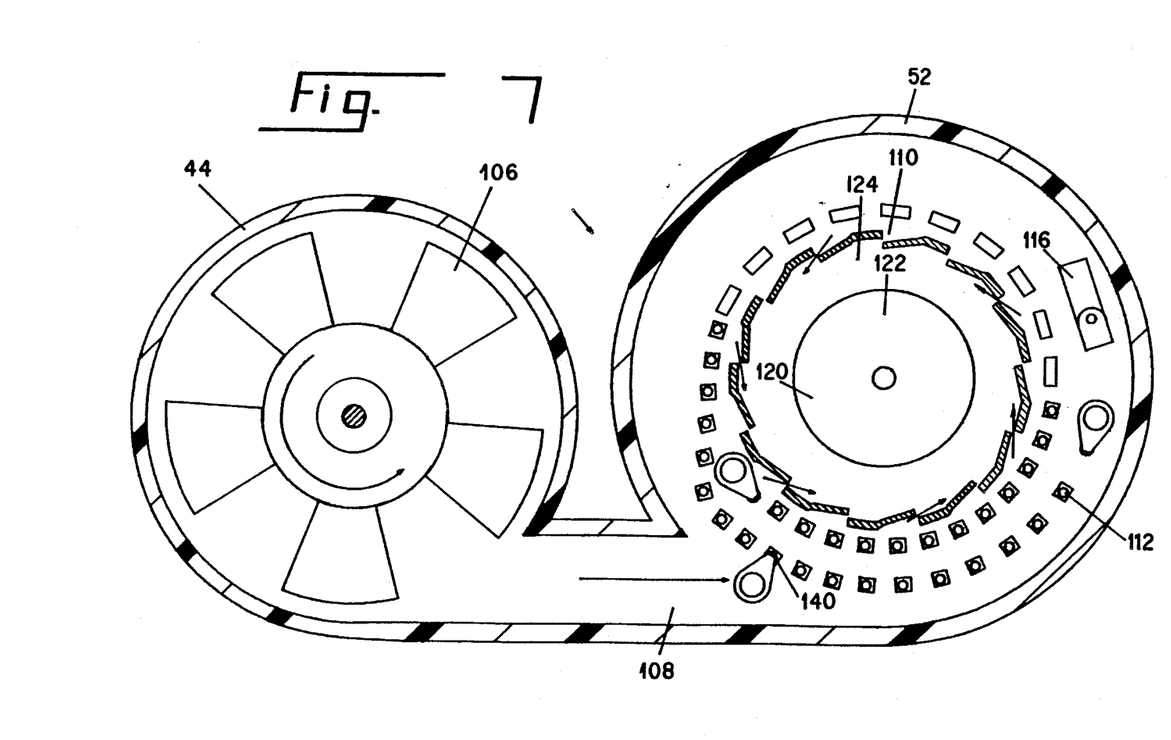
FIG. 7 is a horizontal cross section taken along VII—VII in FIG. 2.

Referring now to FIG. 7, a horizontal cross section through integrated blower and plenum chamber 40 reveals a fan 106 effective for forcing a flow of air through a horizontal air path 108 into plenum chamber 52. Popping chamber 92 has a generally circular cross section defined by a plurality of slanted louvers 110 which are slanted to impart a swirling motion to air entering popping chamber 92. The swirling motion tends to keep the contents of popping chamber 92 in motion for improved heating uniformity and as an aid in permitting popped corn to escape upward and permitting unpopped kernels to remain in popping chamber 92.

A horizontal air path 108 directs the air from fan 106 into plenum chamber 52. An array of heating elements 112 are disposed in plenum chamber 52 about the circumference of popping chamber 92. Heating elements 112 are disposed in an overlapping flat helix whereby first air entering plenum chamber 52 and beginning to travel in a counterclockwise direction encounter parallel arcs of heating elements 112 radially spaced apart. Further around plenum chamber 52, in the counterclockwise direction, only a single row of heating elements 112 is employed. It will be noted that more than one type of heating element 112 may be employed, as indicated by the use of two different shapes in the drawing. The air is heated as it flows past heating elements 112, until it finally passes through slanted louvers 110 at some point about the circumference of popping chamber 92.

It is desirable to have all of the air enter popping chamber 92 at about the same temperature. It was discovered that using a double row of heating elements 112 near the entry of the air into plenum chamber 52, and then reducing to a single row of heating elements for the remainder of the circumference of plenum chamber 52 permitted maintaining the entering air at a temperature uniformity within about 40 degrees C. at any point about the circumference of popping chamber 92. This was a decided improvement over a single row of uniformly spaced heating elements 112 which permitted a temperature variation of as much as 150 degrees in the air entering about the circumference of popping chamber 92.

Several parameters are available for controlling the uniformity of air temperature entering popping chamber 92. As shown, more heating elements 112 may be used in some circumferential locations than others. In addition, the circumferential spacing may be adjusted. Finally, two or more different types of heating elements 112, having different heat-generating capabilities, may be disposed within plenum chamber 52.

A preheat thermostat (not shown) may be disposed in plenum chamber 52 to control energization of WAIT indicator lamp 30 and READY indicator lamp 32 (FIG. 1). In a preferred embodiment of the invention, the preheat thermostat is disposed in intermediate chute 58 (FIG. 2) where it is exposed to an air temperature closely approximating that to which unpopped kernels of corn are exposed when loaded. A high-temperature limit 116 controls energization of WAIT indicator lamp 30 and READY indicator lamp 32 as well as heating elements 112 and blower motor 42 (FIG. 2). In normal operation, the preheat thermostat maintains WAIT indicator lamp 30 energized and READY indicator lamp 32 deenergized until the air temperature reaching it attains a predetermined minimum value. Blower motor 42 is energized during this time to preheat popping chamber 92. When the air temperature exceeds its predetermined minimum, the preheat thermostat deenergizes WAIT indicator lamp 30 and energizes READY indicator lamp 32. This signals a user to charge kernels of corn into popping chamber 92. If the air temperature in plenum chamber 52 rises to a value beyond which danger of overheating may occur, high-temperature limit 116 deenergizes READY indicator lamp 32, blower motor 42 and heating elements 112 and energizes WAIT indicator lamp 30. After the temperature in plenum chamber 52 decreases to a safe value, high-temperature limit 116 reverses its condition to again deenergize WAIT indicator lamp 30 and energize READY indicator lamp 32, heating elements 112 and blower motor 42. In one embodiment of the invention, two high-temperatures limits 116 are employed in series for the additional safety which such redundancy may bring. A fuse (not shown) may also be disposed in plenum chamber 52.

Figure 8:
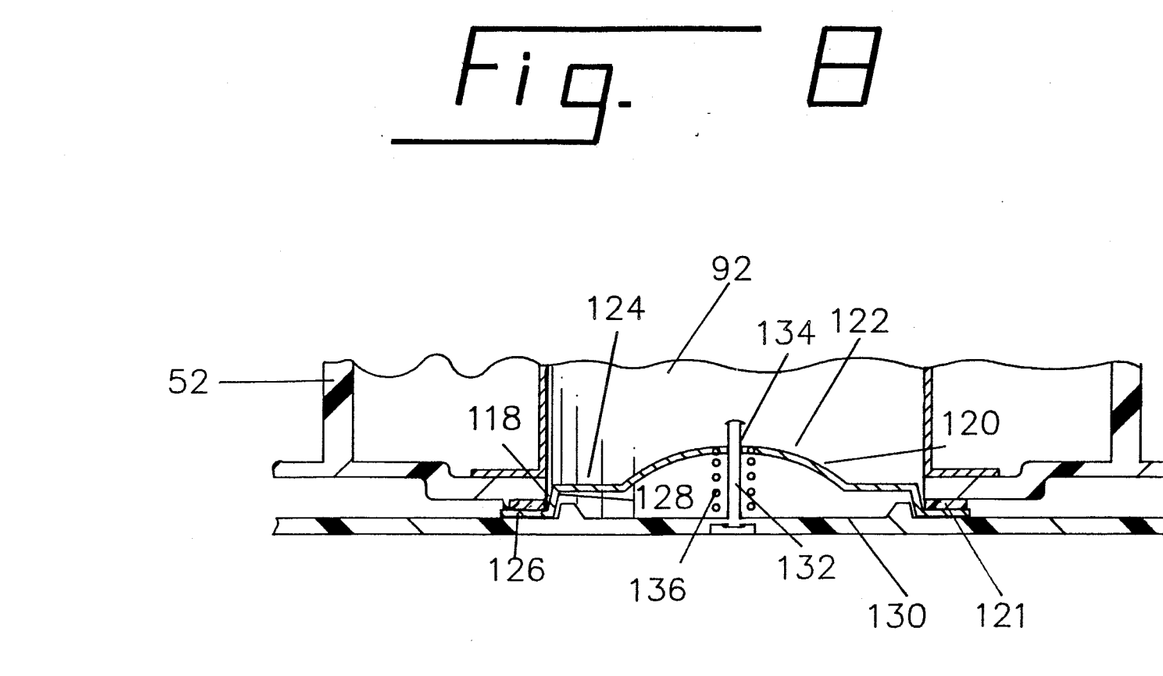
FIG. 8 is a vertical cross section of the popping chamber of the popcorn popper taken along VIII—VIII of FIG. 3.

Referring now to FIG. 8, popping chamber 92 includes an open bottom 118. A spring-loaded bottom cover 120 includes a center dome 122 surrounded by a flat portion 124. An outer lip 126 is joined to flat portion 124 by a truncated conical portion 128. A gasket 121 is affixed to bottom 118 about popping chamber 92 for sealing with outer lip 126. A hinged bottom 130, which may be hinged downward by conventional means (not shown), includes a retaining pin 132 passing therethrough and through a central hole 134 in center dome 122. A helical spring 136 is disposed about retaining pin 132 between hinged bottom 130 and center dome 122 to provide a resilient urging force tending to seal lip 126 and truncated conical portion 128 into open bottom 118. When spring-loaded bottom cover 120 is hinged out of open bottom 118, any unpopped kernels or other debris are free to fall out of popping chamber 92. In addition, open bottom 118 provides free access to popping chamber 92 for cleaning from below without requiring access to the top of air popper 10, thus permitting under-cabinet mounting. Referring momentarily to FIG. 1, hinged bottom 130 is preferably integrally formed with output guide 22 and released from the latched closed position shown in FIG. 8 by depressing latch button 24. When latch button 24 is pressed, output guide 22, together with hinged bottom 130 and spring-loaded bottom cover 120, are hinged downward as described above.

Figure 9:
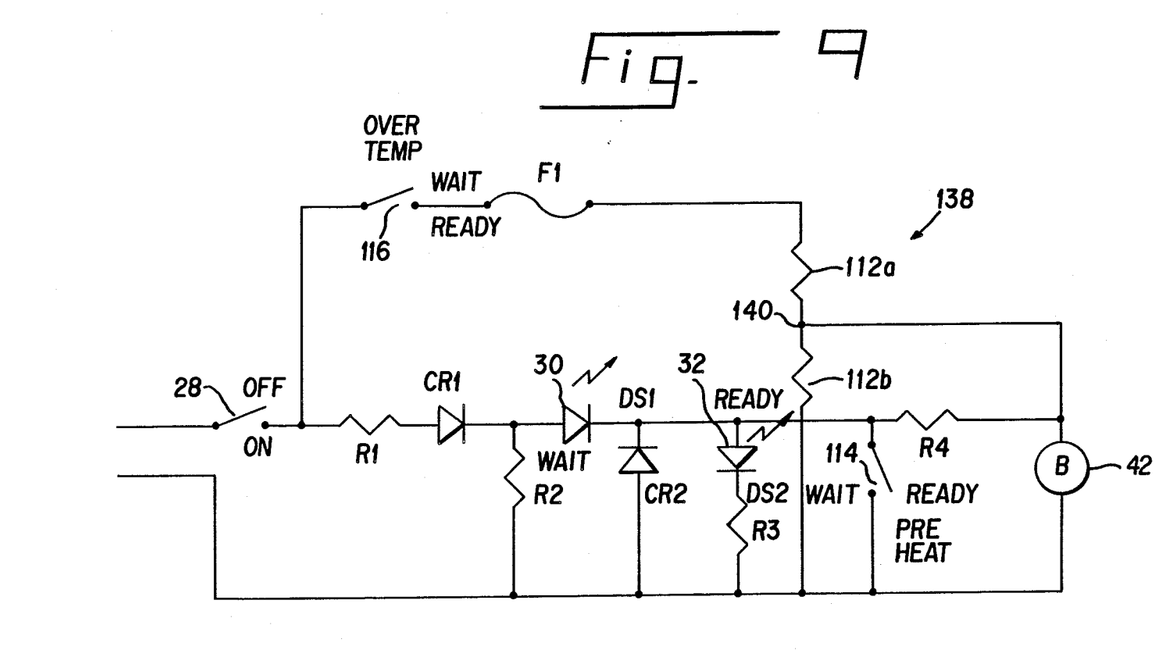
FIG. 9 is a electrical schematic of an electrical control system for the popcorn popper.

Referring now to FIG. 9, an electrical system 138 is shown, capable of controlling air popper 10 as described. AC power is applied through ON-OFF switch 28 to a terminal of a resistor R1 and high-temperature limit 116. A second terminal of high-temperature limit 116 is connected through a fuse F1 to an end of heating element 112. The other end of heating element 112 is connected to the other side of the AC line. Heating element 112 is divided by a tap 140 into first and second portions 112a and 112b. Tap 140 is connected to one terminal of blower motor 42. The other terminal of blower motor 42 is connected to the AC line.

The second terminal of resistor R1 is connected to the anode terminal of a diode CR1. The cathode terminal of diode CR1 is connected to a resistor R2 and to the anode terminal of a light-emitting diode DS1 which serves as WAIT indicator 30. The other terminal of resistor R2 is connected to the AC line. A diode CR2 is connected from the cathode terminal of light-emitting diode DS1 to the AC line. An anode terminal of a light-emitting diode DS2, which serves as READY indicator 32, is connected to the cathode terminal of light-emitting diode DS1. A resistor R3 is connected from the cathode terminal of light-emitting diode DS2 to the AC line. A resistor R4 is connected from the common terminals of light-emitting diodes DS1 and DS2 and diode CR2 to tap 140. Preheat thermostat 114 is also connected from these common terminals to the AC line.

In operation, contacts of high-temperature limit 116 and preheat thermostat 114 initially are closed. When power is applied by closing ON-OFF switch 28, AC power is connected through the closed contacts of high temperature limit 116 and fuse F1 to heating element 112 to begin the generation of heat therein. A voltage at tap 140 is applied to energize blower motor 42. The closed contacts of preheat thermostat 114 place a short circuit across light-emitting diode CR2, whereby READY indicator 32 remains deenergized. Also, the closed contacts of preheat thermostat 114 provides a return for current through light-emitting diode DS1 whereby WAIT indicator 30 is energized. Resistor R4 has a high resistance compared to the resistance of portion 112b of heating element 112. Thus, the short circuit provided by preheat thermostat 114 has negligible effect on the resistance from tap 140 to the AC line.

This condition, with blower motor 42, heating element 112 and WAIT indicator 30 energized and READY indicator 32 deenergized, continues until the contacts of preheat thermostat 114 are opened by the presence of a temperature suitable for popping corn.

When corn-popping temperature is attained, the contacts of preheat thermostat 114 are opened. This removes the return for energization of light-emitting diode DS1. In addition, a voltage fed through resistor R4 to the cathode terminal of light-emitting diode DS1 is effective to reduce the voltage across light-emitting diode DS1 to a value too small to permit light-emitting diode DS1 to illuminate. Thus, WAIT indicator 30 is deenergized. The voltage fed through resistor R4 to the anode terminal of light-emitting diode DS2 is effective for illuminating this light-emitting diode, whereby the READY indicator is energized to inform the user that popcorn may be added. Under normal circumstances, this condition continues through the end of popping.

If the temperature sensed by high-temperature limit 116 exceeds a trigger value, the contacts of high-temperature limit 116 open. This removes energizing power from heating element 112 and blower motor 42, whereby heating and blower operation cease. Also, the voltage from tap 140, previously energizing light-emitting diode DS2 and deenergizing light-emitting diode DS1 is cut off. Thus, WAIT indicator 30 is energized and READY indicator 32 is deenergized to inform the user that popping should not be attempted.

When the apparatus cools sufficiently for contacts of high-temperature limit 116 to close, normal popping conditions, as described above, resumes.

Having described preferred embodiments of the invention with reference to the accompanying drawings, it is to be understood that the invention is not limited to those precise embodiments, and that various changes and modifications may be effected therein by one skilled in the art without departing from the scope or spirit of the invention as defined in the appended claims.

We claim:

1. An air popper for popping popcorn comprising:
   a blower;
   a plenum;
   air conducting means for conducting air from said blower to said plenum;
   a popping chamber in said plenum;
   air admitting means for admitting air from said plenum into said popping chamber;
   air heating means disposed about a circumference of said popping chamber, said air heating means for heating air in at least one of said air conducting means and said plenum; and
   said blower, said plenum and said air conducting means being horizontally disposed with respect to each other, whereby vertical height of said air popper is minimized.

2. An air popper according to claim 1 further comprising:
   an integrated blower and plenum chamber; and
   said blower, said plenum, said popping chamber and said air conducting means being all disposed in said integrated blower and plenum chamber.

3. An air popper according to claim 1 wherein:
   said an air admitting means includes a plurality of louvers in said popping chamber;
   said plurality of louvers including a slant effective for imparting a swirling motion to air entering said popping chamber;
   said an air heating means including a plurality of heating elements disposed in a pattern in a flow direction of air in said plenum;
   said pattern having a non-uniformity;
   said non-uniformity being effective for attaining a substantially uniform air temperature entering said popping chamber about a circumference thereof.

4. An air popper for popping popcorn comprising:
   a popping chamber;
   an intermediate chute above said popping chamber;
   introducing means for introducing a flow of heated air into said popping chamber whereby kernels of corn are heated to a popping temperature;

said flow of heated air being effective for selectively displacing popped corn upward in said intermediate chute;
means for permitting said popped corn to enter a discharge chute; and
said discharge chute being disposed generally parallel to and to one side of said intermediate chute, whereby headroom is conserved.

5. An air popper according to claim 4 wherein at least part of said intermediate chute is a conical section enlarging in the vertical direction.

6. An air popper according to claim 5 wherein said conical section includes an angle of from about 16 to about 45 degrees.

7. An air popper according to claim 6 wherein said conical section includes an angle of from about 22 to about 30 degrees.

8. An air popper according to claim 5 wherein said intermediate chute includes;
a lower cylindrical portion;
an upper cylindrical portion;
said conical section connecting said lower cylindrical portion and said upper cylindrical portion.

9. An air popper according to claim 8 wherein a diameter and length of said lower cylindrical portion, a divergence angle and length of said conical section, and a diameter and length of said upper cylindrical portion are effective for substantially separating popped corn from unpopped kernels.

10. An air popper according to claim 4, further comprising:
said popping chamber including an open bottom; and
a removable bottom cover effective for permitting cleaning said popping chamber without requiring access to a top of said air popper, whereby headroom is conserved.

11. An air popper according to claim 10 wherein said removable bottom cover is hinged into place.

12. An air popper according to claim 11 wherein said removable bottom cover includes resilient means for maintaining a seal at a bottom of said popping chamber.

13. An air popper according to claim 10 wherein said removable bottom cover includes a center dome protruding into said popping chamber.

14. An air popper for popping popcorn, comprising:
a popping chamber;
an intermediate chute above said popping chamber;
means for introducing a flow of heated air into said popping chamber;
said intermediate chute being effective for permitting said heated air to escape upward, thereby carrying popped corn with it;
means in said intermediate chute for separating popped corn from unpopped kernels of corn;
a discharge chute substantially parallel to said intermediate chute;
means for permitting said heated air and said popped corn to move horizontally between a top of said intermediate chute to a top of said discharge chute;
said discharge chute being effective for permitting said heated air and said popped corn to flow downward to exit said air popper; and
means for charging said kernels of corn laterally into said popping chamber without requiring access to a top of said popcorn popper.

15. An air popper according to claim 14 wherein said means for charging said kernels of corn includes means for loading kernels of corn into said air popper without charging said kernels of corn into said popping chamber until a later time.

16. An air popper according to claim 15 wherein said means for charging includes:
a charging drawer;
a charging slide in said charging drawer;
said charging drawer including a charging space having a sloping floor;
said charging space being effective for containing a predetermined amount of said kernels of corn;
means for retaining said kernels of corn in said charging space; and
means responsive to moving said charging slide for permitting said kernels of corn to move down said sloping floor and into said popping chamber.

17. An air popper according to claim 16 wherein said means responsive to moving said charging slide includes:
a first window in a side of said charging drawer adjacent said sloping floor;
a shutter plate attached to said charging slide;
said shutter plate including a second window;
means for maintaining said second window out of alignment with said first window; and
means responsive to movement of said charging slide for moving said second window into alignment with said first window, whereby said kernels of corn are released.

18. An air popper according to claim 17 wherein:
said charging slide includes a rear wall defining part of a perimeter of said charging space;
said rear wall moving with said charging slide to urge said kernels of corn toward said first window; and
an expansion space above said charging space; and
said expansion space being effective to permit said kernels of corn to expand upward during an early stage of said charging, whereby jamming of said kernels of corn is avoided.

* * * * *